(12) United States Patent
Stancovski et al.

(10) Patent No.: US 7,325,392 B2
(45) Date of Patent: Feb. 5, 2008

(54) CONTROL SYSTEM FOR CATALYTIC PROCESSES

(75) Inventors: Victor Stancovski, Groton, CT (US); Sridhar Seetharaman, Pittsburgh, PA (US)

(73) Assignee: Catelectric Corp., Storrs, CT (US)

( * ) Notice: Subject to any disclaimer, the term of this patent is extended or adjusted under 35 U.S.C. 154(b) by 518 days.

(21) Appl. No.: 10/423,376

(22) Filed: Apr. 25, 2003

(65) Prior Publication Data

US 2004/0007475 A1    Jan. 15, 2004

Related U.S. Application Data

(60) Provisional application No. 60/416,966, filed on Oct. 8, 2002, provisional application No. 60/395,729, filed on Jul. 12, 2002.

(51) Int. Cl.
*F01N 3/00* (2006.01)
(52) U.S. Cl. .............. 60/275; 60/274; 60/300; 60/303; 204/157.15; 204/157.52; 204/228.1; 204/274; 205/335; 205/464; 205/637
(58) Field of Classification Search .......... 60/274, 60/275, 295, 300, 303; 204/157.15, 157.52, 204/228.1, 242, 278, 265, 274; 205/334, 205/335, 413, 464, 555, 637
See application file for complete search history.

(56) References Cited

U.S. PATENT DOCUMENTS

| | | | |
|---|---|---|---|
| 2,908,734 A | 10/1959 | Cottle | |
| 4,233,132 A * | 11/1980 | Carr et al. | ........... 204/169 |
| 4,272,336 A | 6/1981 | Vayenas et al. | |
| 4,318,708 A | 3/1982 | Hogberg | |
| 4,329,208 A | 5/1982 | Vayenas et al. | |
| 4,463,065 A | 7/1984 | Hegedus et al. | |
| 4,512,964 A | 4/1985 | Vayenas et al. | |

(Continued)

FOREIGN PATENT DOCUMENTS

EP            0 480 116            4/1992

(Continued)

OTHER PUBLICATIONS

Seetharaman Sridhar, et al. "Effect of oxygen-containing species on the impedance of the Pt/YSZ interface" Solid State Ionics 100 (1997) 17-22.

(Continued)

*Primary Examiner*—Tu M. Nguyen
(74) *Attorney, Agent, or Firm*—Lipsitz & McAllister, LLC

(57) ABSTRACT

The present invention provides methods and systems for controlling a catalytic process. The control system includes: an electroconductive support having a layer of a catalyst thereon; a first electrode in contact with said electroconductive support; a second electrode in contact with said catalyst layer; a current control unit for applying a current to said first and second electrodes and for controlling and varying the amount of current applied; an impedance measurement unit for continuously, monitoring and measuring the polarization impedance across an interface between the catalyst layer and the electroconductive support; a processing-unit for comparing the measured polarization impedance with a reference value. The amount of current applied to the catalyst layer and the electroconductive support via the first and second electrodes is varied to change the polarization impedance when the measured polarization impedance differs from the reference value.

20 Claims, 2 Drawing Sheets

U.S. PATENT DOCUMENTS

| | | | |
|---|---|---|---|
| 4,643,806 | A | 2/1987 | Hegedus et al. |
| 5,006,425 | A | 4/1991 | Takabayashi |
| 5,232,882 | A | 8/1993 | Yoshimoto et al. |
| 6,194,623 | B1 | 2/2001 | Frenzel et al. |
| 6,214,195 | B1 | 4/2001 | Yadav et al. |
| 6,267,864 | B1 | 7/2001 | Yadav et al. |
| 6,387,228 | B1 * | 5/2002 | Maget ............... 204/230.2 |
| 6,562,495 | B2 * | 5/2003 | Yadav et al. ................ 429/12 |
| 6,723,886 | B2 * | 4/2004 | Allison et al. ............. 568/909 |
| 7,001,500 | B2 * | 2/2006 | Bors et al. ................ 205/413 |
| 7,087,147 | B2 * | 8/2006 | Bors et al. ................ 205/413 |
| 2001/0000889 | A1 | 5/2001 | Yadav et al. |
| 2002/0045076 | A1 | 4/2002 | Dieckmann et al. |
| 2003/0010629 | A1 | 1/2003 | St. Pierre et al. |
| 2005/0202660 | A1 | 9/2005 | Cohen et al. |

FOREIGN PATENT DOCUMENTS

| | | |
|---|---|---|
| EP | 0 665 047 | 8/1998 |
| WO | 95/20556 | 8/1995 |

OTHER PUBLICATIONS

Seetharaman Sridhar, et al. "Transient and Permanent Effects of Direct Current on Oxygen Transfer across YSZ-Electrode Interfaces" Journal of the Electrochemical Society, vol. 144; No. 7, Jul. 1997.

Victor Stancovski et al. "Thermodynamic Stability and Interfacial Impedance of Solid-Electrolyte Cells with Noble-Metal Electrodes" Journal of Electroceramics 3:3, 279-299; 1999.

"Corrosion of Materials"; Applications of Impedance Spectroscopy p. 260-267.

"Optimisation of Solid State Electrochemical Processes for Hydrocarbon Oxidation (OSSEP)," European Science Foundation, Oct. 2000, 8 pages.

S.L. Douvartzides, et al., "Electrochemically Promoted Catalysis: The Case of Ethanol Oxidation over Pt," Journal of Catalysis 211, pp. 521-529, 2002.

D. Tsiplakides et al., "Introduction to Electrochemical Promotion, *Non-faradaic Electrochemical Modification of Catalytic Activity* (*NEMCA effect*)," J. Electrochemical Soc., 144(6), 272-288, 1997 (25 pages).

*Modern Aspects of Electrochemistry No. 29*, "The Electrochemical Activation of Catalytic Reactions", Constantinos G. Vayenas et al., pp. 57-202, Plenum Press—New York and London, 1996.

T.J. Schmidt et al., "Oxygen electrocatalysis in alkaline electrolyte: Pt(*hkl*), Au(*hkl*) and the effect of PD-modification," Electrochimica Acta 47, pp. 3765-3776, 2002.

Gianfranco Pacchioni et al., "Electric field effects in heterogeneous catalysis," Journal of Molecular Catalysis A: Chemical 119, pp. 263-273, 1997.

Ian S. Metcalfe, "Electrochemical Promotion of Catalysis, II: The Role of a Stable Spillover Species and Prediction of Reaction Rate Modification," Journal of Catalysis 199, pp. 259-272, 2001.

G. Fóti et al., "Transient behavior of electrochemical promotion of gas-phase catalytic reactions," Journal of Electroanalytical Chemistry 532, pp. 191-199, 2002.

S. Bebelis et al., "Electrochemical activation of catalytic reactions using anionic, cationic and mixed conductors," Solid State Ionics 129, pp. 33-46, 2000.

Soonho Kim et al., "Solid electrolyte aided studies of NO-CO reaction on Pd," Solid State Ionics 136-137, pp. 693-697, 2000.

G. Fóti et al., "Electrochemical Promotion of $IrO_2$ Catalyst for the Gas-Phase Combustion of Ethylene," publisher and publication date unknown (1 page).

* cited by examiner

CONTROL SYSTEM FOR CATALYTIC PROCESSES

Priority of U.S. Provisional Patent Application Ser. Nos. 60/416,966, filed on Oct. 8, 2002 and 60/395,729 filed on Jul. 12, 2002 is claimed under 35 U.S.C. §119(e).

BACKGROUND OF THE INVENTION

1. Field of the Invention

The present invention relates to a control system for catalytic processes. The present invention further relates to a control system for in processes for reforming hydrocarbon streams and for pollution remediation of exhaust streams.

2. Description of the Prior Art

Catalyst systems are employed extensively to reform light hydrocarbon streams, i.e. reduce methane and other light hydrocarbons to hydrogen, and to remediate exhaust streams, i.e. reduce/oxidize internal combustion exhaust to innocuous compounds.

A problem encountered with catalyst systems is poisoning of the catalyst. One source of such poisoning is adsorption/infiltration of oxygen-containing species such as carbon monoxide. Carbon monoxide interferes with the catalysis mechanism. Another source of poisoning is the deposition of carbon.

Methods of addressing catalyst poisoning include applying to the catalyst a direct current (DC) electric field and/or heating it to an elevated temperature, i.e. about 300° C. to about 800° C. Most commonly, an electric field and heat are concurrently applied. Application of a DC electric field and heat expels or pumps oxygen-containing molecular species from the catalyst. Application of DC current and/or heat to catalysts is described in the following: U.S. patent/application Ser. Nos. 2001/0000889 A1; 2002/0045076 A1; 4,318,708; 5,006,425; 5,232,882; 6,214,195; and 6,267,864. Such application is also described in the following literature references: *Effect of Oxygen-containing Species on the Impedance of the Pt/YSZ Interface*, Solid State Ionics, 100, 17 to 22 (1997); *Transient and Permanent Effects of Direct Current on Oxygen Transfer across YSZ-Electrode Interfaces*, Journal of the Electrochemical Society, 2479 to 2485, vol. 144, No. 7 (1997); and *Thermodynamic Stability and Interfacial Impedance of Solid-Electrolyte Cells with Noble-Metal Electrodes*, Journal of Electroceramics, 3:3, 279 to 299 (1999). The above U.S. patents/applications and literature references are incorporated herein in their entirety.

A problem encountered with application of a DC electric field to catalyst systems is a lack of a means for monitoring and sensing the level of poisoning present in the catalyst in real time or on a continuous basis. This lack of means to monitor and sense the level of poisoning in the catalyst in real time hinders precise and timely application of DC electric fields. Precise and timely application of DC electric field is important because if the field is too weak, the rate of expulsion of oxygen-containing species may be too low and such species may accumulate. If the DC field is too strong, the incidence of catalytically effective sites in the catalyst may be reduced.

The application of heat to catalyst systems also has the problem lack of real time control means but also suffers from imprecise effects of temperature on catalyst behavior and physical structure. If the temperature of the catalyst is too low, the catalyst may become fouled (dirty) and the kinetics of the catalyzed reaction may be negatively altered. If the temperature is too high, the kinetics of the catalyzed reaction may be negatively altered and/or the microstructure of the catalyst destroyed.

Other methods of addressing catalyst poisoning include chemical treatment and replacement of the catalyst. The chemical treatment is disadvantageous because continuous treatment is not possible and catalyst behavior is difficult to predict or control. Replacement of catalyst is expensive and requires shutdown of the process.

It would be desirable to have a system for controlling the application of a DC electric field and/or heat in a catalyst system. It would further be desirable to have a system for controlling the application of a DC electric field and/or heat in a catalyst system in a process for reforming hydrocarbon streams and for pollution remediation of combustion exhaust streams.

SUMMARY OF THE INVENTION

According to the present invention, there is a control system for a catalytic process. The control system comprises the following: a) an electroconductive support having a layer of a catalyst thereon; b) a means for applying DC current of one polarity to the catalyst layer and the opposite polarity to the electroconductive support; c) a means for controlling and varying the application of DC current; d) a means for measuring the polarization impedance across the catalyst layer and the electroconductive support; e) a means for comparing the measured polarization impedance with a reference value; and f) a means for varying the application of DC current to the catalyst layer and the electroconductive support when the measured polarization impedance differs from the reference value. The control system may further optionally comprise the following: g) a means for heating the electroconductive support; h) a means for controlling and varying the application of heat; and i) a means for varying the application of heat to the catalyst and the electroconductive support when the measured polarization impedance differs from the reference value.

Further according to the present invention, there is a control system for a catalytic process. The control system has an electroconductive support having a layer of a catalyst thereon. A current control unit communicates with a first electrode and a second electrode opposite in polarity to the first electrode. The current control unit controls and varies the application of DC current to the first and second electrodes. The first electrode is in contact with the electroconductive support. The second electrode is in contact with the catalyst. The current control unit controls and varies the application of an AC current to the first and second electrodes. An AC sensor is in communication with the catalyst layer or the electroconductive layer. The level of AC current in the first and second electrodes and the level of AC current detected at the AC sensor at two different frequencies is communicated to an impedance measurement unit where polarization impedance is determined. The impedance measurement unit communicates with a central processing unit wherein the measured polarization impedance is compared to a reference value. The central processing unit communicates with the current control unit to vary the application of DC current to the first and second electrodes when the determined polarization impedance differs from the reference value.

Still further according to the present invention, there is a control system for a catalytic process. The control system has a) first and second system components each having an electroconductive support having a catalyst layer thereon wherein the catalyst layers are spaced-apart from, in proximity to, and oriented toward each other; b) a means for applying a DC field across the two catalyst layers; c) a means for controlling and varying the application of the DC field; d) a means for measuring the polarization impedance across the two catalyst layers; e) a means for comparing the measured polarization impedance with a reference value; and f) a means for varying the application of the DC field across the two catalyst layers when the measured polarization impedance differs from the reference value.

Further yet according to the present invention, there is a control system for a catalytic process. The control system has first and second system components each having an electroconductive support having a catalyst layer thereon wherein the catalyst layers being spaced-apart from, in proximity to, and oriented toward each other. A current control unit communicates with a first electrode and a second electrode opposite in polarity to the first electrode. The current control unit controls and varies the application of DC current to the first and second electrodes. The first electrode contacts the first system component and the second electrode contacting the second system component. An AC sensor communicates with the second system component. The current control unit communicates with the AC sensor and controls and varies the application of AC current to the first and second electrodes. The level of AC current in the first and second electrodes and the level of AC current detected at the AC sensor at two different frequencies is communicated to an impedance measurement unit where polarization impedance is determined. The impedance measurement unit communicates with a central processing unit wherein the measured polarization impedance is compared to a reference value. The central processing unit communicates with the current control unit to vary the application of DC current to the first and second electrodes when the measured polarization impedance differs from the reference value.

DETAILED DESCRIPTION OF THE INVENTION

Figure 1:
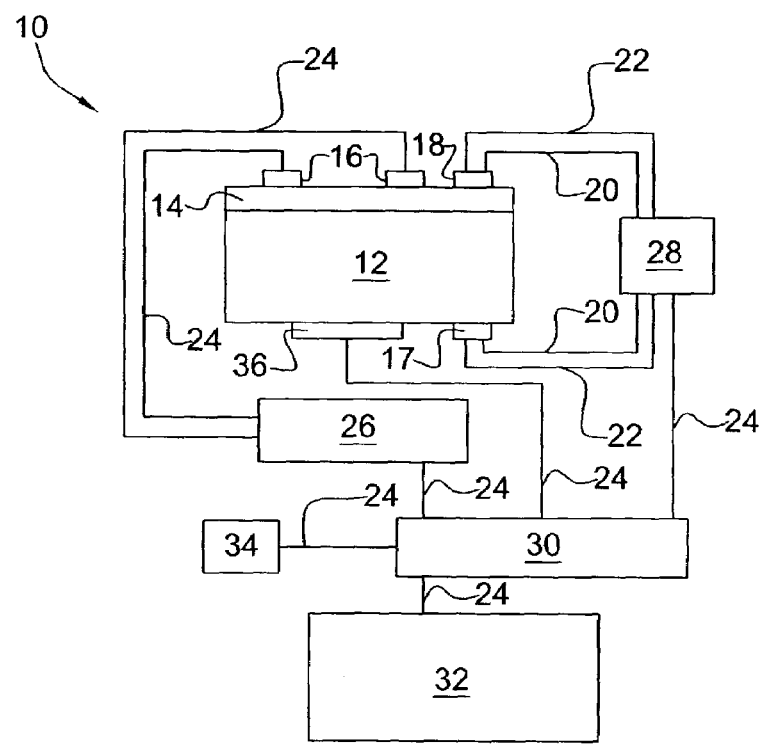
FIG. 1 is a schematic diagram of a control system in accordance with the present invention.

It was surprisingly found that there could be an in situ means for controlling and maintaining the effectiveness of a catalyst system. It was also surprisingly found that there could be such a system for controlling and maintaining the effectiveness of a catalyst system in a process for reforming hydrocarbon streams and for pollution remediation of combustion exhaust streams.

The present invention provides an in situ means for detecting the level of poisoning in a catalyst and means for maintaining precise control of the application of a DC electric field and, optionally, heat (temperature) thereto. Catalyzed reaction conditions can be optimized for maximum conversion of reactant chemical species and/or selection of certain reaction pathways and products. The DC current can be set to maximize the number of catalytically effective sites in the catalyst, if desired. The reaction temperature of the catalyzed reaction can be set to maximize reaction rate and/or select certain reaction pathways and products and prevent poisoning/fouling of the catalyst.

The in situ sensor employs alternating current (AC) at variable frequency and is connected along the same circuit as the direct current. The sensor continuously monitors the state of the catalyst by measuring impedance in a three point arrangement. The higher the concentration of oxygen-containing species or poisoning species like carbon monoxide in the catalyst, the higher the polarization component of the impedance. The sensor communicates with a central processing unit (CPU), which communicates with the control mechanisms regulating the voltage of DC current applied and, optionally, the amount of heat applied.

Polarization impedance is the difference between impedance measured at low and high frequencies of alternating current. Polarization impedance can be calculated according to the following formulas I and II:

$$i_{corr}=[\beta_a\beta_c/2.303(\beta_a+\beta_c)][1/R_p] \quad (I)$$

$$R_p=|Z(jw)|_{w\to 0}-|Z(jw)|_{w\to\infty} \quad (II)$$

wherein $i_{corr}$=steady state corrosion current;
$\beta_a$=Tafel constant for aniodic reaction;
$\beta_c$=Tafel constant for cathodic reaction;
$R_p$=polarization impedance (ohm);
$w=2\times\pi\times f$ wherein $\pi=3.141$ and f is the frequency of the alternative current applied and expressed in hertz (Hz);
$j$=the imaginary unit number $(-1)^{1/2}$
$Z(jw)$=the complex impedance of the interface as a function of the frequency (ohm);
$jw)|_{w\to 0}$=the complex impedance of the interface when the frequency approaches zero (ohm); and
$|Z(jw)|_{w\to\infty}$=the complex impedance of the interface when the frequency approaches a very high frequency(ohm).

Test frequencies will vary depending on the characteristics and requirements of the system, but suitable low frequencies typically range from about 0.1 Hz to about 100 Hz and suitable high frequencies typically range from about 10 kilohertz to about 5 megahertz. Polarization impedance is typically expressed in ohm. The method for calculating polarization impedance is set forth in *Applications of Impedance Spectroscopy*, J. Ross McDonald, p. 262, John Wiley & Sons (1987), which is incorporated herein by reference.

In the present control system, impedance generally corresponds to the difference or drop in AC current across a catalyst layer/electroconductive support, which will vary in structure depending upon the structure of the catalyst system. The difference in AC current will usually be between the first electrode/second electrode and the AC sensor. The polarization impedance is obtained when the impedance is measure at a low and a high frequency.

An embodiment of the present control system is seen in FIG. 1 and is generally referenced by the numeral 10. Control system 10 has an electroconductive support 12 and a catalyst layer 14 situated thereon. A current control unit 28 communicates with and controls and provides DC current to a first electrode 17 and a second electrode 18 through current cables 20. First electrode 17 is contiguous to and in electrical contact with electroconductive support 12. Second electrode 18 is contiguous to and in electrical contact with catalyst layer 14. Current control unit 28 also controls and provides AC current to first electrode 17 and second electrode 18 through current cables 22. A polarization impedance measurement unit 26 communicates with AC sensors 16, which are contiguous to and electrical contact with catalyst layer 14 through data transmission cables 24. Control system 10 also has a heater 36 and a heating control unit 34. Heating control unit 34 communicates with heater 36 through an interface 30 and a data transmission cable 24. The current control unit 28, polarization impedance measurement unit 26, and heating control unit 34 communicates with and are controlled by a central processing unit 32 through interface 30. When control system 10 is in operation, the process throughput such as a hydrocarbon stream or combustion exhaust will contact catalyst layer 14 as it impinges or otherwise traverses it. Electrodes may take any electroconductive form, but usually take the form of an electrically conductive wire or conduit contacting catalyst layer 14 or support 12. A Solartron 1260 (Solartron Co.) can carry out all control and measurement functions, including current control, central processing unit, provision of direct and alternating current, and impedance measurement.

Figure 2:
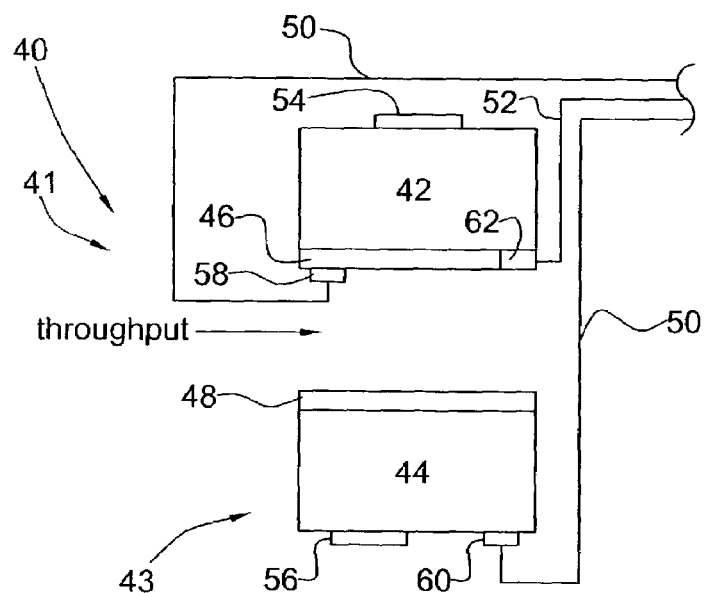
FIG. 2 is a schematic diagram of a control system wherein two catalyst layers are oriented toward each other.

Another embodiment of the present control system is seen in FIG. 2 and is generally referenced by the numeral 40. Control system 40 is two component assemblies 41 and 43. Component assembly 41 has an electroconductive support 42, a catalyst layer 46, and a heater 54. Component assembly 43 has an electroconductive support 44, a catalyst layer 48, and a heater 56. A current control unit (not shown) communicates with and controls and provides both AC and DC current to a first electrode 58 and a second electrode 60 through current cables 50. First electrode 58 is contiguous to and in electrical contact with catalyst layer 46. Second electrode 60 is contiguous to and in electrical contact with electroconductive support 44. A polarization impedance measurement unit (not shown) communicates with AC sensor 62, which is contiguous to and electrical contact with catalyst layer 46 through data transmission cable 52. Heaters 54 and 56 are controlled by a heating control unit (not shown). When control system 40 is in operation, the process throughput such as a hydrocarbon stream or combustion exhaust will contact catalyst layers 46 and 48 as it passes between them.

Figure 3:
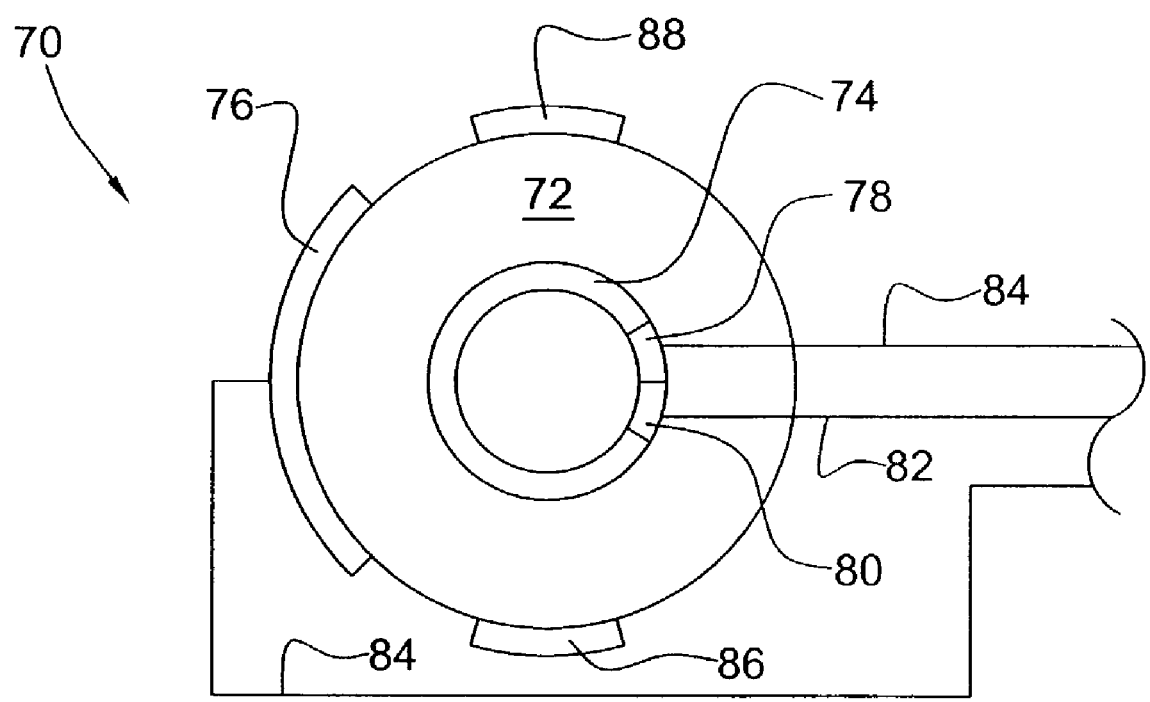
FIG. 3 is a schematic diagram of a control system wherein the catalyst layer is cylindrical in shape.

Another embodiment of the present control system is seen in FIG. 3 and is generally referenced by the numeral 70. Control system 70 is essentially tubular or cylindrical in configuration (not shown). FIG. 3 is a cross-section view of that control system of essentially tubular or cylindrical configuration. Control system 70 is adapted to function to function to transport, process, and serve as a catalytic reactor for process throughput such as a hydrocarbon stream or combustion exhaust. Control system 70 may be placed within tubing, piping, or other conduit if desired.

Further regarding FIG. 3, control system 70 is shown to have an electroconductive support 72, a catalyst layer 74, and heaters 86 and 88. A current control unit (not shown) communicates with and controls and provides both AC and DC current to a first electrode 76 and a second electrode 78 through current cables 84. First electrode 76 is contiguous to and in electrical contact with electroconductive support 72. Second electrode 78 is contiguous to, embedded in, and in electrical contact with catalyst layer 74. A polarization impedance measurement unit (not shown) communicates with AC sensor 80, which is contiguous to, embedded in, and electrical contact with catalyst layer 74 through data transmission cable 82. Heaters 86 and 88 are controlled by a heating control unit (not shown). When control system 70 is in operation, the process throughput will pass through an essentially continuous passageway 90 (normal to the cross-section view in FIG. 3) and contact catalyst layer 74 as it passes between them.

In process operation, the catalyst layer is typically maintained at a temperature of about 100° C. to about 800° C. When the level of polarization impedance needs to be reduced, the temperature of the catalyst layer may be elevated to higher levels, e.g. up to about 1060° C., for a period of time sufficient for the polarization impedance to fall to the desired level. Typically, the temperature of the catalyst layer will be elevated for about 1 minute or more.

The present invention is useful in reforming feedstocks containing methane and other light hydrocarbons, e.g. ethane, propane, and butane, to elemental hydrogen ($H_2$). This process is particularly useful in fuel cells.

The present invention is also useful in remediating pollution, i.e. converting gaseous pollutants to innocuous compounds. For instance, nitrous oxides ($NO_x$) can be reduced to elemental nitrogen ($N_2$). Carbon monoxide (CO) can be oxidized to carbon dioxide ($CO_2$). Hydrocarbons (HC) can be converted to carbon dioxide and water.

The electroconductive support may be any material upon which a catalyst can be deposited and that is electrically conductive to a sufficient degree. Suitable materials include solid electrolytes, mixed conductors, and cermets. Examples of solid electrolytes include oxygen ion conductors, solid solutions, and proton conductors. Examples of oxygen ion conductors include stabilized zirconia, stabilized bismuth oxide, yttria-stabilized bismuth oxide, and $Nb_2O_5$-stabilized bismuth oxide, sodium beta alumina, hydronium beta alumina, and porous metals. Examples of solid solutions include those of $CaTiO_3$, $SrTiO_3$, and $LaAlO_3$. A useful proton conductor is Nafion (E.I. duPont de Nemours & Co.). An example of a mixed conductor is cerium oxide based solid solutions. An example of a cermet is molybdenum silicide.

The electroconductive support may take any shape or configuration known in the art such a disk or other planar surface, a hollow cylinder, or a honeycomb.

The catalyst may be selected from any known to be useful in reforming hydrocarbon feedstocks or remediating pollution. Useful catalysts include metals or electrically conductive ceramics. Useful metals include platinum and palladium. Useful ceramics include $SnO$—$In_2O_3$ mixtures.

The catalyst may be deposited on a surface of the electroconductive support by any technique known in the art such as painting, electrophoresis, and gas-vapor deposition. Such techniques will typically be followed by a thermal or electrochemical treatment for attaining the desired coverage factor, porosity and degree of physical contact with the support. The catalyst may be deposited on any or all surfaces of the support.

The heat source may employ any means of generating heat know in the art such as electricity, gas, oil, or other fuel. The heat source is located in proximity to and preferably contiguous to the electroconductive support and/or catalyst layer. Preferably, the heat source provides heat to the support and, in turn, via conduction to the catalyst layer. Heat may be provided by any or all of the modes of conduction, convection, and/or radiation. Some portion of heat may be provided to the catalyst layer by process throughput such as the hydrocarbon feedstock or combustion exhaust if such throughput exhibits an elevated temperature. Typically, any heat provided by process throughput would be augmented or supplemented by the heat source.

Optionally, hydrocarbon feedstocks or pollution streams may be passed through gas filtration media to remove contaminants prior to contact with the catalyst. Such filtration media can help maintain the integrity of the catalyst and lengthen its service life. Useful filtration media includes woven and non-woven varieties of paper, fabric, plastic, and other synthetic materials as well as metal grate and open-cell foams.

The present invention may also be employed in conjunction with control systems that employ electromagnetic radiation to maintain effectiveness of the catalyst system as described above. The same means for measuring polarization impedance could be employed across an electroconductive support having a catalyst surface thereon as described above. When the polarization impedance differs from a reference value, electromagnetic radiation of certain type, energy and/or frequency could be applied to the catalyst surface.

The present invention is also useful for certain military applications. The catalyst system may be employed to oxidize and/or reduce nerve gases/liquids, poisons, or other toxins to inert or innocuous compounds. The catalyst system may be employed in gas masks or in breathing, aeration, ventilation systems, and the like. The catalyst system may be useful in aeration/ventilation systems for battlefield vehicles such as tanks and armored personnel carriers.

It should be understood that the foregoing description is only illustrative of the present invention. Various alternatives and modifications can be devised by those skilled in the art without departing from the invention. Accordingly, the present invention is intended to embrace all such alternatives, modifications and variances that fall within the scope of the appended claims.

What is claimed is:

1. A method for controlling a catalytic process, comprising:
   providing an electroconductive support having a layer of a catalyst thereon;
   applying a first current to said catalyst layer and said electroconductive support;
   applying a second current to said catalyst layer and said electroconductive support;
   continuously monitoring and measuring the polarization impedance across an interface between the catalyst layer and the electroconductive support;
   comparing the measured polarization impedance with a reference value; and
   varying the amount of the first current applied to the catalyst layer and the electroconductive support to change the polarization impedance when the measured polarization impedance differs from the reference value;
   wherein the second current is applied for use in said monitoring and measuring of said polarization impedance.

2. A method for controlling a catalytic process, comprising:
   providing an electroconductive support having a layer of a catalyst thereon;
   applying a DC current to the electroconductive support and the catalyst layer;
   applying an AC current to the electroconductive support and the catalyst layer;
   continuously monitoring and determining polarization impedance at an interface between said catalyst layer and said electroconductive support based on sensed values of the AC current at the catalyst layer and the electroconductive support;
   comparing the measured polarization impedance to a reference value; and
   varying the amount of DC current applied to the first and second electrodes to change the polarization impedance when the determined polarization impedance differs from the reference value.

3. A control system for a catalytic process, comprising:
   an electroconductive support having a layer of a catalyst thereon;
   a first electrode in contact with said electroconductive support;
   a second electrode in contact with said catalyst layer;
   a current control means for applying a current to said first and second electrodes and for controlling and varying the amount of the current applied;
   impedance measurement means for continuously monitoring and measuring the polarization impedance across an interface between the catalyst layer and the electroconductive support;
   processing means for comparing the measured polarization impedance with a reference value;
   wherein:
   the amount of the current applied to the catalyst layer and the electroconductive support via the first and second electrodes is varied to change the polarization impedance when the measured polarization impedance differs from the reference value; and
   the current comprises a first current which is varied to change the polarization impedance of the interface and a second current which is applied for use in said monitoring and measuring of said polarization impedance.

4. The control system of claim 3, further comprising:
   a heating device for heating the catalyst layer; and
   a heating control unit for controlling the heating device;
   wherein the application of heat to the catalyst layer and the electroconductive support are varied when the measured polarization impedance differs from the reference value.

5. The control system of claim 3, wherein:
   the electroconductive support is tubular in shape, and
   the catalyst extends along at least a portion of the inner diameter of the tubular support.

6. The control system of claim 3, further comprising:
   a current sensor in contact with the catalyst layer at a point generally opposite and across from the first electrode;
   wherein the current sensor provides a signal to the impedance measurement unit with information regarding sensed current at the catalyst layer.

7. The control system of claim 3, wherein the electroconductive support is selected from the group consisting of solid electrolytes, mixed conductors, and cermets.

8. The control system of claim 3, wherein the electroconductive support is selected from the group consisting of stabilized zirconia, stabilized bismuth oxide, yttria-stabilized bismuth oxide, $Nb_2O_5$-stabilized bismuth oxide, sodium beta alumina, hydronium beta alumina, Nafion, a porous metal, cerium oxide-based solid solutions, $CaTiO_3$ solid solutions, $SrTiO_3$-based solid solutions, $LaAlO_3$-based solid solutions, and molybdenum silicide.

9. The control system of claim 3, wherein the catalyst is selected from the group consisting of a metal or an electrically conductive ceramic.

10. The control system of claim 3, wherein the catalyst is selected from the group consisting of platinum, palladium, and $SnO$—$In_2O_3$ mixtures.

11. The control system of claim 3, wherein said current comprises at least one of: (a) an alternating current; (b) a direct current; and (c) a direct current and an alternating current.

12. The control system of claim 3, wherein:
   said first current comprises one of an alternating current or a direct current; and
   said second current comprises an alternating current.

13. The control system of claim 3, wherein a stream of one of light hydrocarbons or combustion exhaust contacts the catalyst layer.

14. A control system for a catalytic process, comprising:
an electroconductive support having a layer of a catalyst thereon,
a first electrode contacting the electroconductive support,
a second electrode opposite in polarity to the first electrode contacting the catalyst layer,
a current control unit communicating with the first electrode and the second electrode, the current control unit controlling and varying: (a) an application of DC current to the first and second electrodes, and (b) an application of an AC current to the first and second electrodes,
an impedance measurement unit for continuously monitoring and determining polarization impedance at an interface between said catalyst layer and said electroconductive support,
an AC sensor being in communication with the impedance measurement unit and one of the catalyst layer or the electroconductive layer, a level of AC current in the first and second electrodes and a level of AC current detected at the AC sensor at two different frequencies being communicated to the impedance measurement unit for use in said determining of said polarization impedance,
a central processing unit in communication with the impedance measurement unit,
wherein:
the measured polarization impedance is compared to a reference value at said central processing unit,
the central processing unit communicates with the current control unit to vary the amount of DC current applied to the first and second electrodes to change the polarization impedance when the determined polarization impedance differs from the reference value.

15. The control system of claim 14, further comprising a heat control unit communicating with a heat source, the heat source being adapted to apply heat to the catalyst layer, the heat control unit controlling the rate and temperature of heat applied by the heat source to the catalyst layer, the central processing unit communicating with the heat control unit to vary the application of heat when the measured polarization impedance differs from the reference value.

16. The control system of claim 14, wherein the electroconductive support is selected from the group consisting of solid electrolytes, mixed conductors, and cermets.

17. The control system of claim 14, wherein the electroconductive support is selected from the group consisting of stabilized zirconia, stabilized bismuth oxide, yttria-stabilized bismuth oxide, $Nb_2O_5$-stabilized bismuth oxide, sodium beta alumina, hydronium beta alumina, Nafion, a porous metal, cerium oxide-based solid solutions, $CaTiO_3$ solid solutions, $SrTiO_3$-based solid solutions, $LaAlO_3$-based solid solutions, and molybdenum silicide.

18. The control system of claim 14, wherein the catalyst is selected from the group consisting of a metal or an electrically conductive ceramic.

19. The control system of claim 14, wherein the catalyst is selected from the group consisting of platinum, palladium, and $SnO$—$In_2O_3$ mixtures.

20. The control system of claim 14, wherein a stream of one of light hydrocarbons or combustion exhaust contacts the catalyst layer.

* * * * *

UNITED STATES PATENT AND TRADEMARK OFFICE
CERTIFICATE OF CORRECTION

PATENT NO.       : 7,325,392 B2
APPLICATION NO. : 10/423376
DATED            : February 5, 2008
INVENTOR(S)      : Stancovski et al.

Page 1 of 1

It is certified that error appears in the above-identified patent and that said Letters Patent is hereby corrected as shown below:

Column 9, line 22: change "electroconductive layer" to --electroconductive support--.

Signed and Sealed this

Twelfth Day of August, 2008

JON W. DUDAS
*Director of the United States Patent and Trademark Office*